United States Patent Office 3,268,606
Patented August 23, 1966

3,268,606
β-CAROTENE PROCESS
Herbert K. Jaeger, Kalamazoo, Mich., assignor to The Upjohn Company, Kalamazoo, Mich., a corporation of Delaware
No Drawing. Filed Sept. 27, 1963, Ser. No. 311,995
8 Claims. (Cl. 260—666)

This invention relates to an improved process for the recovery of β-carotene produced in a microbiological fermentation. More particularly it relates to a process in which β-carotene is isolated in crystalline form from a fermentation beer which contains at least 400 mg. per liter of carotenoid pigments of which at least 70% consists of β-carotene. According to this process, the mycelium is separated and treated with a water-miscible drying alcohol to dry it and to condition the mycelial cells for extraction, the dried cells are extracted with a solvent for β-carotene, and the β-carotene is crystallized directly from the extract.

Heretofore, in recovering β-carotene from a β-carotene fermentation the art has employed the steps of drying the mycelium and extracting it with a solvent for β-carotene. However, it has been necessary to subject such solvent extracts to one or more saponification treatments followed by re-extraction and chromatography, in order to prepare the β-carotene for crystallization.

It has now been found according to this invention that the necessity of saponification, re-extraction, and chromatography can be avoided and the recovery and isolation of crystaline β-carotene greatly simplified by separating the mycelium from a fermentation beer containing at least 400 mg. per liter of carotenoid pigment of which at least 70% consists of β-carotene, drying the separated mycelium with a water-miscible drying alcohol, extracting the washed mycelium with a solvent for β-carotene, and crystallizing β-carotene directly from the extract thus obtained.

Production of a fermentation beer containing at least 400 mg. of carotenoid pigments per liter of which at least 70% consists of β-carotene can be accomplished by employing procedures such as those disclosed in U.S. Patents 3,025,221 and 3,079,380, modifications thereof, and by other known fermentation processes for β-carotene.

The microorganisms used for the production of β-carotene belong to the class Phycomycetes, the order Mucorales, and the family Choanephoraceae. (Classification is based on that of H. Zycha, "Mucorineae" in Kryptogamenflora der Mark Brandenburg, vol. 6a, 1935). Of particular importance are those of the genera Mucor, Blakeslea, Choanephora, Phycomyces, Pilaira, and Parasitella, such as *Mucor hiemalis, Blakeslea trispora, Blakeslea circinans, Choanephora conjuncta, Choanephora curcurbitarum, Phycomyces blakesleeanus, Pilaira anomala,* and *Parasitella simplex*. Other fungi from the order of the Mucorales may also be selected for carrying out the process. Many of these fungi are available in public culture collections, and others can be isolated from the air, the soil, putrefying plants, and other natural materials by standard procedures familiar to mycologists.

The fermentation broth, prepared by one of the described procedures, or a modification thereof, is first filtered with or without the use of a filter aid, such as diatomaceous earth. The resulting wet mycelial cake contains practically all (more than 95%) of the carotenoids formed during the fermentation. Due to their complete insolubility in water and their occurrence within the mycelial cells, the carotenoids can be extracted efficiently only after disruption of the cell walls and removal of the water. The removal of the water and distintegration of the cell walls is accomplished by drying the cells with a water-miscible drying alcohol, such as methanol, ethanol, n-propanol, isopropanol and t-butyl alcohol. Advantageously, the mycelial cells are dried to such an extent that subsequent extractions with a solvent for β-carotene (a water-immiscible solvent) does not produce two phases. Anhydrous alcohols, for example, anhydrous methanol are preferred. Ordinary alcohol (95% ethanol), however, can be used effectively. Alcohols containing more water can be used as long as the essential drying character of the alcohol is preserved, that is, as long as the alcohol is capable of drying the mycelium to such an extent that extraction with a water-immiscible solvent does not produce two phases. Ordinarily it will not be necessary or desirable for the water content of the water-miscible drying alcohol to exceed about 10% by volume.

After the mycelial cells have been dried and disrupted, the carotenoids can be recovered readily from the essentially dry mycelium by extracting with a solvent for the carotenoids. For example, β-carotene is reasonably soluble in hydrocarbon and chlorohydrocarbon solvents of the aliphatic and aromatic series (particularly methylene chloride, ethylene dichloride, chloroform, carbon tetrachloride, chlorobenzene, cyclohexane, benzene, and toluene). Advantageously, a solvent boiling between about 40° and about 200° C. is used. The extraction can be carried out at room temperature or at elevated temperatures in batch treatments, by leaching or by forcing the solvent through the mycelial cake (pressure or vacuum filtration). The amount of solvent used for the extraction depends on the kind of solvent and procedure used. The extracts are combined and β-carotene is crystallized directly therefrom by evaporating the solvent or by cooling or by addition of a precipitating solvent, for example, methanol, ethanol, isopropanol acetone, ethylacetate, or preferably by a combination of these procedures. The crystalline β-carotene is filtered, washed, and recrystallized from a suitable solvent or combination of solvents.

In view of the degrading effect which light and oxygen have on β-carotene, it is desirable to conduct β-carotene processes in the dark or in at least subdued light and in an inert atmosphere.

The carotenoids present in the fermentation broth can be quantitatively assayed by spectrophotometric analysis. For example, extracts containing β-carotene can be assayed using a Bausch and Lomb recording spectrophotometer by recording the absorption curve between 300 and 600 m$\mu$ and comparing the ε-values with the known corresponding values of pure crystalline β-carotene (137,000 at 456 m$\mu$ in acetone or 129,000 at 465 m$\mu$ in chloroform) as standard. Also, thin-layer chromatography can be employed to confirm the presence of β-carotene and to detect other carotenoid components concomitantly produced in small amounts.

The following examples are illustrative of the process of the present invention, but are not to be construed as limiting.

*Example 1.—Isolation of β-carotene*

The whole beer from a 250 l. *Blakeslea trispora* fermentation according to U.S. Patent 3,079,380, Example 1, was filtered using 3% (w./v.) of diatomaceous earth as filter aid. The whole beer contained 375 g. of carotenes of which β-carotene accounted for about 95 to 97%.

A 100 g. portion of the wet mycelial cake (corresponding to 340 ml. whole beer) was suspended in 210 ml. of anhydrous methanol, stirred mechanically for 5 min. and filtered. The filtrate, which contained less than 1 mg. of carotenes, was discarded. A second treatment of the mycelium with 220 ml. of anhydrous methanol removed another 2 mg. of carotenes and resulted in essentially dry (water-free) mycelium.

The alcohol-washed mycelium was suspended in 260 ml. of methylene chloride, stirred mechanically for 2 to 3 min. and filtered. The dark orange filtrate contained 468 mg. (92% of the total) of carotenes. The mycelium was treated once more in the same way with 240 ml. of methylene chloride. This second methylene chloride extract contained another 33 mg. (6.5% of the total) of carotenes. The methylene chloride extracts were combined to give 500 ml. of "crude solvent extract" containing 501 mg. of carotenes.

The "crude solvent extract" was evaporated in vacuo below 35° C. until all solvent had distilled off. The residue consisted of a heterogeneous mixture of crystalline β-carotene and a viscous red oil. Acetone (50 ml.) was added and the mixture was filtered. The filtrate, which contained only 27 mg. (5.3%) of carotenes, was discarded. The crystals at this point were of sufficient purity to be used in most preparations where crystalline β-carotene is desired. However, in order to effect a higher degree of purification, the crystals were dissolved in 60 ml. of $CHCl_3$. A small amount of insoluble white material was removed by filtration. The filtrate was concentrated to 28 ml., 42 ml. of absolute ethanol was added, and the β-carotene was permitted to crystallize over a period of 4 hrs. at room temperature (in the dark under $N_2$); filtration gave 435 mg. (85% yield) of crystalline β-carotene of high purity. (The mother liquid contained 36 mg. of β-carotene.) A second recrystallization from a mixture of 80 ml. of benzene and 115 ml. of 95% ethanol gave 398 mg. (78% yield) of β-carotene crystals which had a melting point of 180–182° C., λ max. $(CHC_3) = 465$ m$\mu$, $\epsilon$ at 465 m$\mu = 128,000$ $(CHCl_3)$.

A whole beer from a Blakeslea trispora fermentation, as defined above, but containing about 1 g. of carotenes/liter, about 70% of which consisted of β-carotene, when processed in the manner disclosed above, yielded 400 mg. of β-carotene crystals.

Example 2

A crude solvent extract (1320 ml. containing 1344 mg. of carotenes) was prepared as in Example 1. The crude solvent extract was then concentrated in vacuo below 30° C to 150 ml. containing part of the β-carotene in crystalline form. Isopropanol (150 ml.) was added, and the β-carotene crystals (1275 mg.) were harvested by filtration. The crystals were dissolved in 100 ml. of $CHCl_3$, filtered and 100 ml. of 95% ethanol was added to produce high purity β-carotene crystals which were removed by filtration. Another recrystallization from 490 ml. of benzene-ethanol (1:1) gave 882 mg. (66% yield) of pure crystalline β-carotene having a λ max. $(CHCl_3) = 465$ m$\mu$, $\epsilon$ at 465 m$\mu = 128,200$, and a melting point of 180–182° C.

Example 3

A wet mycelial cake with a carotene content of about 3 g./kg. was prepared as in Example 1 and a 100 g. portion of it was treated with methanol as described in Example 1. Following further the procedure of Example 1, but substituting benzene for methylene chloride as extraction solvent, resulted in two benzene extracts containing 274 mg. and 18 mg. of carotene. They were combined and concentrated in vacuum at 35° C. to 20 ml. β-Carotene started to crystallize toward the end of the evaporation process. Acetone (40 ml.) was added to the mixture which was subsequently cooled to 6–8° C. After about 1 hr. the mixture was filtered and the β-carotene crystals were washed with 20 ml. acetone; yield, 226 mg. crystalline β-carotene (M.P. 170–180° C.). For further purification the crystals were dissolved in 20 ml. chloroform, filtered, concentrated to 8–10 ml. (at 40° C.) and 20 ml. of acetone was added. β-Carotene was allowed to crystallize over a period of 2–3 hours at 4° C. Filtration gave 215 mg. (72%) pure crystalline β-carotene, M.P. 180–182°; λ max=456 m$\mu$ ($\epsilon$=134,000 in acetone).

Example 4

A wet mycelial cake with a carotene content of about 3 g./kg. was prepared as described in Example 1. A 200 g. portion of it was suspended in 500 ml. absolute ethanol, stirred mechanically for 3 min. and filtered. The only slightly-colored filtrate was discarded. A second identical treatment with absolute ethanol resulted in essentially anhydrous mycelium.

The alcohol-washed mycelium was stirred mechanically for 2–3 min. with 500 ml. of ethylene dichloride, filtered, resuspended in 500 ml. of ethylene dichloride and after brief mechanical stirring, filtered again. The extracted mycelium was gray in appearance and was discarded.

The ethylene dichloride extracts, containing 563 mg. and 35 mg. carotene, were combined and concentrated in vacuum at 35° C. to 30 ml.

Crystallization of β-carotene started at a volume of about 100 ml. and continued until the evaporation was interrupted (at about 30 ml.). In order to increase the yield of crystalline material, the concentrate was kept for 1½ hr. at 4° C. The mixture was filtered, the β-carotene crystals were washed with 20 ml. of acetone and recrystallized as described in Example 3 from a mixture of acetone and chloroform (2:1); yield 380 mg. (63%) of pure crystalline β-carotene (M.P. 179–182°, λ max.=465 m$\mu$, $\epsilon$=135,000 in acetone).

I claim:
1. A process for the preparation of crystalline β-carotene which consists of:
   (1) submerged aerobic fermentation of an organism of the class Phycomycetes and the order Mucorales in a nutrient medium until a minimum carotenoid titer of 400 mg./liter, of which at least about 70% is β-carotene, is present in the fermentation beer,
   (2) separating the mycelial cells from said microbiological fermentation beer,
   (3) drying the separated mycelial cells with a water-miscible drying alcohol,
   (4) extracting the alcohol-dried mycelial cells with a solvent for β-carotene to give a solvent extract containing β-carotene,
   (5) concentrating the solvent extract containing β-carotene, and,
   (6) crystallizing β-carotene from the concentrated solvent extract.
2. The process as defined in claim 1 wherein the microbiological fermentation broth is obtained from a microbiological fermentation of Blakeslea trispora.
3. The process as defined in claim 1 wherein the water-miscible drying alcohol is anhydrous methanol.
4. The process as defined in claim 1 wherein the alcohol-dried mycelial cells are extracted with a dichloroalkane.
5. The process as defined in claim 1 wherein β-carotene is crystallized from the solvent extract by evaporating the solvent.
6. The process as defined in claim 1 wherein the water-miscible drying alcohol is absolute ethanol.
7. The process as defined in claim 1 wherein the alcohol-dried mycelial cells are extracted with benzene.
8. The process as defined in claim 1 wherein the alcohol-dried mycelial cells are extracted with ethylene dichloride.

(References on following page)

References Cited by the Examiner

UNITED STATES PATENTS

| | | | |
|---|---|---|---|
| 2,484,040 | 10/1949 | Lange et al. | 260—666 |
| 2,959,521 | 11/1960 | Zajic | 195—28 |
| 3,001,912 | 9/1961 | Miescher | 195—28 |
| 3,025,221 | 3/1962 | Ciegler et al. | 195—28 |
| 3,079,380 | 2/1963 | Ciegler et al. | 260—236.5 |

OTHER REFERENCES

J. Biol. Chem., vol. 214, pp. 515–517, 1955.

H. L. Barnett et al.: Science, vol. 123, No. 3187, Jan. 27, 1956, p. 141.

DELBERT E. GANTZ, *Primary Examiner.*

V. O'KEEFE, *Assistant Examiner.*